United States Patent [19]
Albertson et al.

[11] Patent Number: 5,673,563
[45] Date of Patent: Oct. 7, 1997

[54] PRESSURE RELIEF APPARATUS AND METHOD OF USE PARTICULARLY FOR A REFRIGERATION SYSTEM

[76] Inventors: Luther D. Albertson, 3934 Carver St., New Albany, Ind. 47150; Walter R. Key, 6362 Minlo Dr., Indianapolis, Ind. 46227; Mark B. Key, 6434 Harting Overlook, Indianapolis, Ind. 46237

[21] Appl. No.: 676,555

[22] Filed: Jul. 8, 1996

[51] Int. Cl.$^6$ .................................................. F25D 29/00
[52] U.S. Cl. ...................... 62/56; 62/174; 62/149; 62/228.1
[58] Field of Search ...................... 62/149, 174, 228.1, 62/86, 56; 417/44.2; 137/557

[56] References Cited

U.S. PATENT DOCUMENTS

| | | |
|---|---|---|
| 3,187,135 | 6/1965 | Singer . |
| 3,256,398 | 6/1966 | Snider . |
| 3,618,628 | 11/1971 | Krumer . |
| 4,365,124 | 12/1982 | Robinson . |
| 4,418,548 | 12/1983 | Sawyer . |
| 5,259,204 | 11/1993 | McKeown ........................... 62/174 |
| 5,361,592 | 11/1994 | Lewis ................................ 62/86 |

OTHER PUBLICATIONS

Henry Valve & Subsidiaries Tech Tips, entitled "Isolate Expensive, Potentially Damaging Refrigerants with Henry Valve Sentry Rupture Disc Assembly".

*Primary Examiner*—John M. Sollecito
*Attorney, Agent, or Firm*—Woodard, Emhardt, Naughton, Moriarty & McNett

[57] ABSTRACT

The present invention relates to a pressure relief system that utilizes fluid released from a pressure relief valve to activate a sensor. In one form of the present invention a relatively confined passageway is in fluid communication with a reseatable pressure relief valve for protecting a condenser from overpressurization. The pressure relief valve allowing the release of fluid into the passageway at pressures below the overpressure threshold protection value of the valve. The released fluid is accumulated in the passageway and sensed by a sensor. Further, upon the pressure in the relatively confined passageway exceeding a predetermined value the passageway is vented to the environment.

51 Claims, 5 Drawing Sheets

PRESSURE RELIEF APPARATUS AND METHOD OF USE PARTICULARLY FOR A REFRIGERATION SYSTEM

BACKGROUND OF THE INVENTION

The present invention relates generally to the field of pressure relief systems for mechanical refrigeration systems, and more particularly to a pressure relief system that utilizes fluid released from a pressure relief valve to activate a sensor. Although the invention was developed for mechanical refrigeration systems, certain applications may be outside of this field.

Refrigeration systems are utilized in many commercial and industrial applications, such as to provide air conditioning in hotels, the cooling of heat transfer medium in a manufacturing process, and commercial food refrigeration systems. Inherent with each of the above refrigeration systems is a customer expectation of minimal equipment downtime. Any downtime associated with the mechanical refrigeration system is at best an inconvenience for the customer, and often can have very costly consequences, such as food spoilage in commercial food refrigeration systems.

Mechanical refrigeration systems generally utilize a chlorinated fluorocarbon (CFC) refrigerant. CFC refrigerants, many of which are sold by DuPont under the well known trade name FREON have various boiling points depending on the particular type of CFC refrigerant. FREON and its related family of compounds are well known and widely used as heat transfer media in mechanical refrigeration systems wherein the transfer of heat involves manipulating the compounds to various temperature and pressure states. Any significant misuse and/or malfunction of the refrigerant system can cause excessive internal pressure and without prompt corrective action may lead to damage of the equipment and/or injury to personnel.

It is known that refrigeration systems generally include the pressurized storage of a vaporized refrigerant. In an effort to comply with applicable state and/or local codes and regulations most refrigeration systems include a pressure relief system for protecting the pressure vessel from overpressurization. For many years there was minimal industry recognition of problems associated with venting CFC refrigerants from the pressure vessel into the environment. Recently, because of the concern for the environment and the possible destruction of the ozone layer above the earth, it has become desirable, and in many cases mandated that the release of CFC refrigerant into the environment be minimized.

Environmental concerns, though significant, are not the only factor in favor of minimizing the release of CFC refrigerant into the environment. In recent years the price of many CFC refrigerants have escalated drastically, for example the price of some refrigerants have increased over ten fold, while the available supply is dwindling. Thus, for economic and environment reasons it is desirable to minimize the discharge of refrigerant into the environment.

Figure 1:
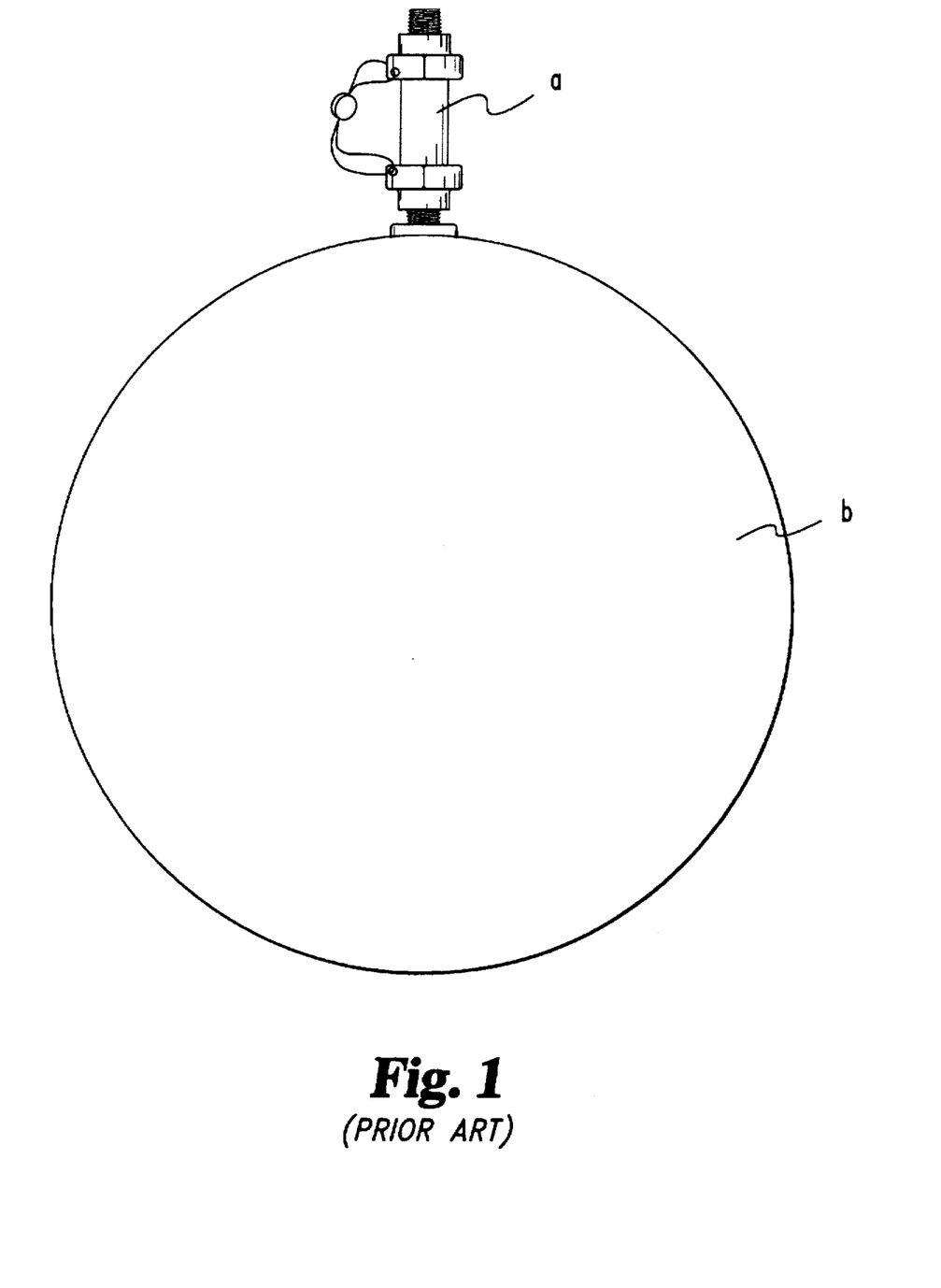
FIG. 1 is an illustrative view of a prior art pressure relief valve connected to a pressure vessel comprising a portion of a refrigeration system.

In the design of pressure relief systems for mechanical refrigeration systems it has become an industry practice to utilize a mechanical pressure relief reseating type valve. Typically, mechanical reseating type valves have been connected to a pressure vessel or fluid pathway which is connected to the pressure vessel. With reference to FIG. 1, there is illustrated a prior art mechanical reseating type valve (a) which is connected to a pressure vessel (b). The valve (a) being a mechanical reseating type valve which is operable to allow the discharge of refrigerant from the vessel (b) to protect the vessel from overpressurization, and recloseable to prevent further release of fluid from the vessel.

A common limitation associated with many prior art pressure relief systems is that once the pressure in the pressure vessel approaches the overpressure state their are no additional safeguards to prevent the continued rise in system pressure. Therefore, in many prior art systems the venting of refrigerant from the vessel is imminent once the pressure approaches the overpressure state. Once the pressure relief valve has opened it remains open sufficiently long to allow the discharge of a sufficient quantity of refrigerant therefrom to reduce the system pressure.

Even with a variety of earlier designs of pressure relief systems for mechanical refrigeration systems, there remains a need for an improved pressure relief system. The present invention satisfies this need in a novel and unobvious way.

SUMMARY OF THE INVENTION

One form of the present invention contemplates an apparatus, comprising: a refrigeration system; a pressure relief valve coupled to the refrigeration system for controlling the release of fluid therefrom; a normally relatively confined passageway in fluid communication with the valve for receiving fluid released from the refrigeration system; a member for normally preventing the release of fluid from the passageway and allowing the release of fluid from the passageway at a predetermined pressure, the predetermined pressure being substantially less than the pressure required for opening the valve.

Another form of the present invention contemplates a method for detecting the release of refrigerant from a pressure relief valve coupled to a pressure vessel within a mechanical refrigeration system. The method, comprising: providing a relatively confined volume in fluid communication with the pressure relief valve; releasing into the relatively confined volume refrigerant from the pressure relief valve, the releasing at a pressure less than the pressure necessary for opening the pressure relief valve; accumulating the refrigerant from the releasing in the relatively confined volume; and sensing the pressure change in the relatively confined volume.

One object of the present invention is to provide an improved pressure relief system.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
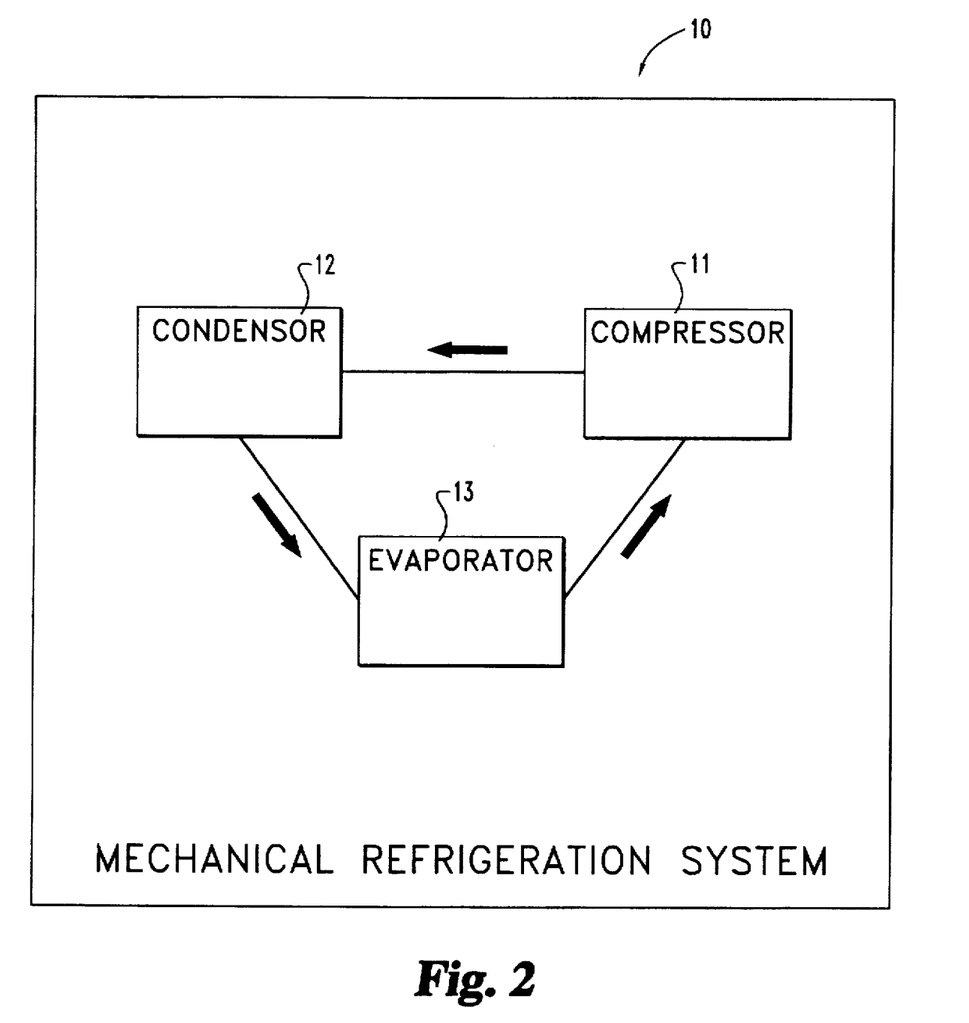
FIG. 2 is a schematic view of a mechanical refrigeration system.

With reference to FIG. 2 there is illustrated a mechanical refrigeration system 10 which comprises a closed loop system having three primary components. The three components are a compressor 11, a condenser 12, and an evaporator 13. In a preferred embodiment a pressure vessel is in fluid communication with the condenser 12, and in a more preferred embodiment the condenser 12 comprises the pressure vessel. In operation, a fluorocarbon refrigerant fluid flows through the closed loop system. Refrigerants which are useable in present refrigeration systems include all man-made refrigerants, such as Freon 12, R22, R-500 or other CFCs, and HFC 134a. It is well known to a person of ordinary skill in the art that the compressor 11 is utilized to compress the refrigerant fluid from a relatively low pressure gaseous state to a higher pressure gaseous state.

The relatively high pressure refrigerant gas upon exiting the compressor 11 flows into the condenser 12, which functions as a heat exchanger. The condenser 12 removes energy from the vaporized refrigerant to facilitate the condensation of the relatively high pressure refrigerant vapor into a liquified refrigerant. The cooled liquid refrigerant then generally flows through an expansion device that reduces the fluid pressure and regulates the flow of refrigerant fluid into evaporator 13. Evaporator 13 functions to cool a heat exchange medium therein as the liquid refrigerant is vaporized into a low pressure refrigerant gas, thereby absorbing energy from the heat exchange medium. The low pressure refrigerant gas is then drawn into the compressor 11 to begin the refrigerant cycle once again.

Figure 3:
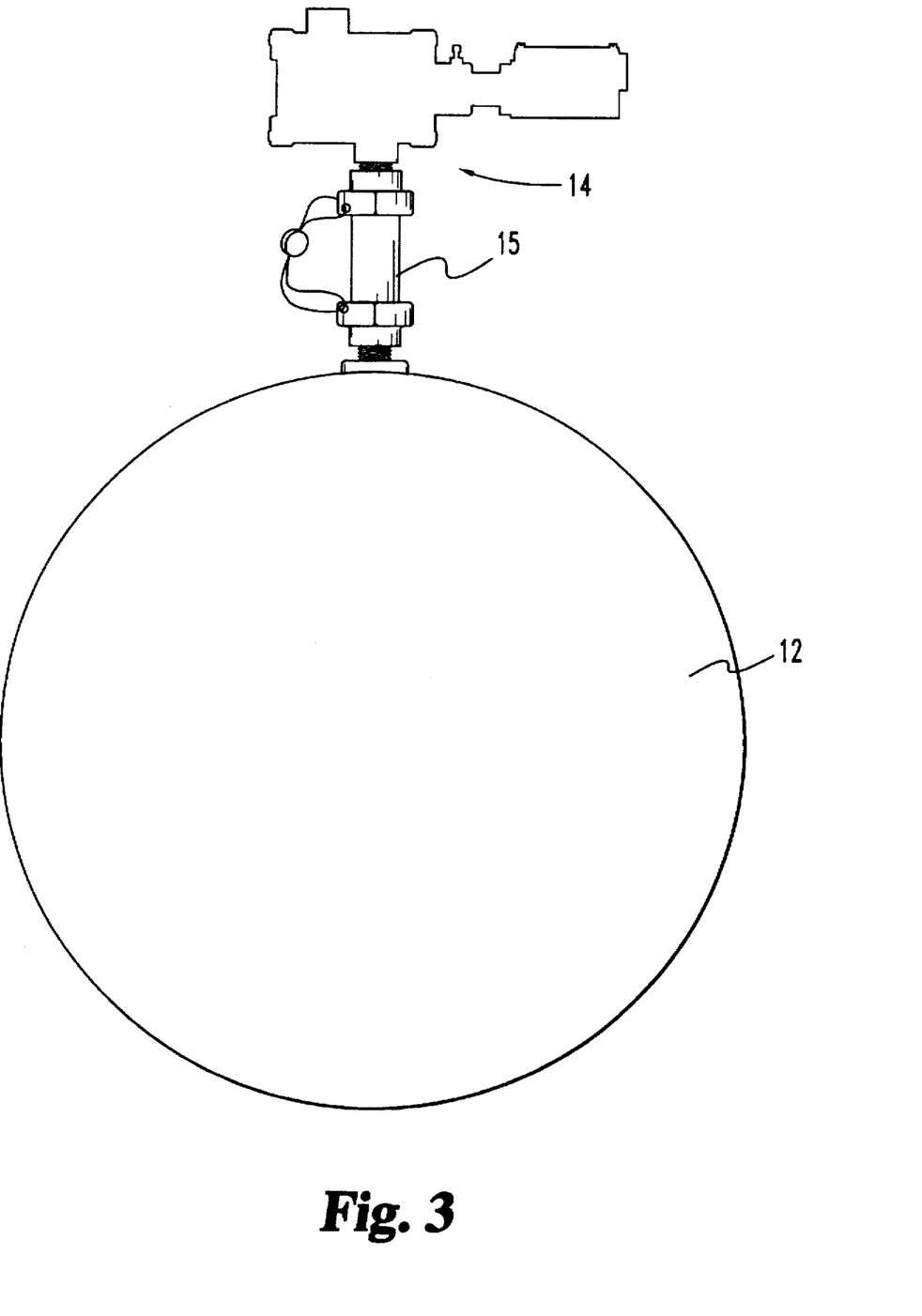
FIG. 3 is a perspective view of one embodiment of the pressure relief system of the present invention coupled to a pressure vessel comprising a portion of the FIG. 2 mechanical refrigeration system.

Referring to FIG. 3, there is illustrated an enlarged side elevational view of the condenser/pressure vessel 12 having one embodiment of pressure relief system 14 coupled thereto. Pressure relief systems are generally utilized to comply with safety codes and to protect the equipment and associated personnel from potential damage and harm associated with the handling of a pressurized fluid. The pressure relief system 14 normally prevents the discharge of refrigerant gas from the condenser/pressure vessel 12 into the environment while protecting the condenser/pressure vessel 12 from overpressurization. Upon the pressure within the condenser/pressure vessel 12 exceeding a predetermined threshold pressure the reseatable bubble tight pressure relief valve 15 of the pressure relief system 14 opens to vent refrigerant gas therefrom. In the preferred embodiment bubble tight pressure relief valve 15 is coupled to condenser/pressure vessel 12. The threshold pressure necessary to open the pressure relief valve 15 is dependent upon many parameters, and the selection of a pressure relief valve that will open at the desired threshold pressure is within the capability of those of ordinary skill in the art.

In one preferred embodiment of pressure relief system 14, reseatable pressure relief valve 15 is designed to open at about four hundred pounds (400) per square inch gage. Further, it is preferred that pressure relief valve 15 be designed to open in a range of about two hundred to four hundred and fifty (200–450) pounds per square inch gage. The above threshold pressure values for opening the pressure relief valve are not intended to be limiting, and it is understood that pressure relief valves opening at other threshold pressures are contemplated herein.

Figure 4:
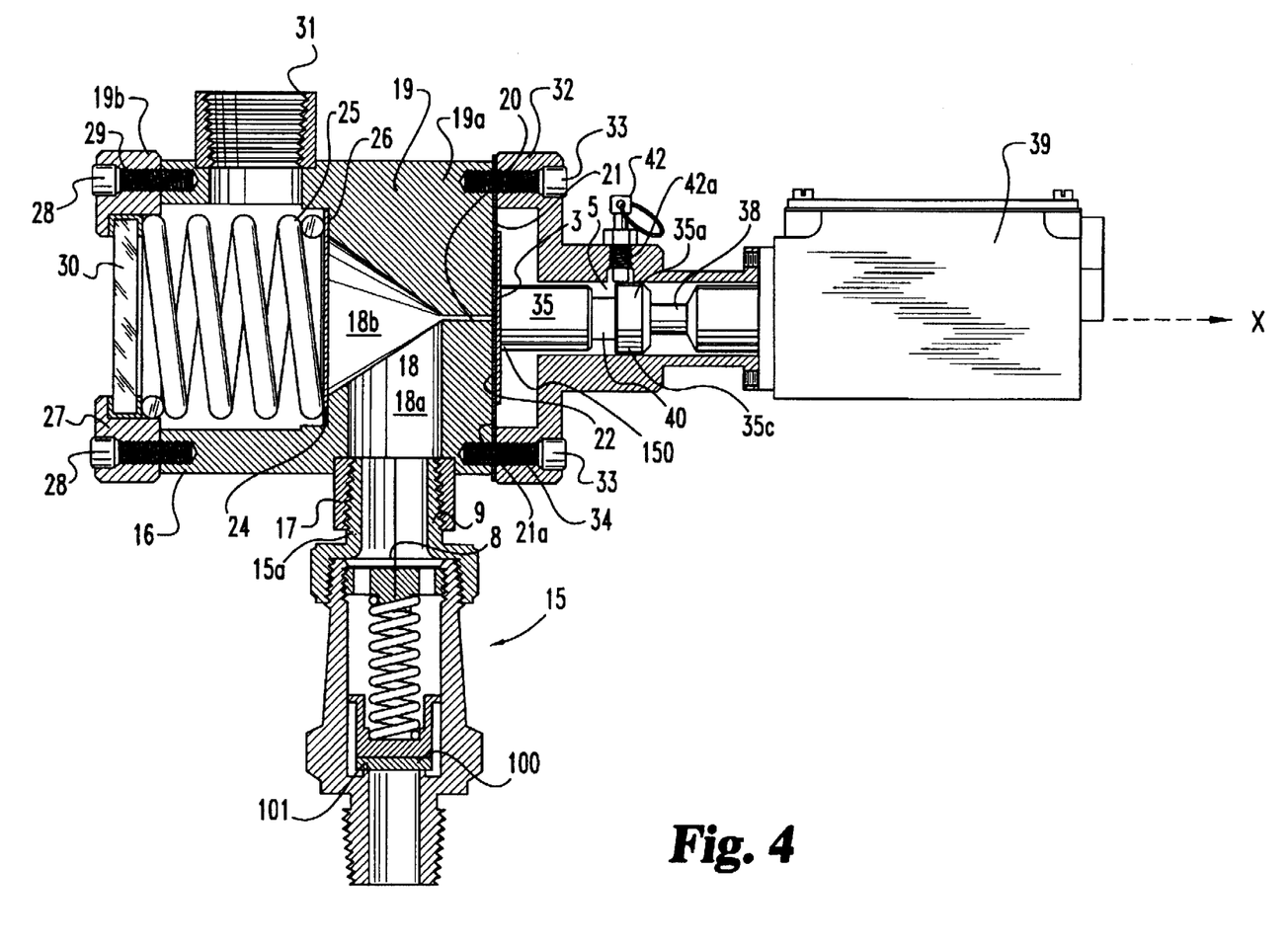
FIG. 4 is an enlarged sectional side elevational view of the pressure relief system of FIG. 3, in an unactuated state.

With reference to FIG. 4, there is illustrated an enlarged side elevational view of the pressure relief system 14 removed from the condenser/pressure vessel 12. In the preferred embodiment the pressure relief system 14 comprising the pressure relief valve 15 and a pressure relief guard apparatus 16. The direct acting reseatable pressure relief valve 15 being removeably coupled to the pressure relief guard apparatus 16 by a threaded joint 9; formed from an externally threaded portion 15a of relief valve 15, and an internally threaded connector 17 connected to the relief guard apparatus 16. Pressure relief guard apparatus 16 being installable on most existing pressure relief valves known to persons of ordinary skill in the art.

A normally relatively confined fluid passageway 18 coupled to and extending from the the outlet 8 of the pressure relief valve 15 into the relief guard apparatus 16 for receiving fluid released from the condenser/pressure vessel 12. In the preferred embodiment normally relatively confined passageway 18 is formed in a mechanical housing 19. The normally relatively confined passageway 18 having a substantially cylindrical portion 18a, and a substantially conical portion 18b in fluid communication with one another. It is understood that other geometric configurations for passageway 18 are contemplated herein. It is preferred that the normally relatively confined passageway 18 have a volume of about one to one and one half cubic inches. It is understood that other passageway volumes are contemplated herein so long as they provide the necessary characteristics for operation of the relief guard apparatus 16. In the preferred embodiment passageway 18 opening into a secondary passageway 20 at the first end 19a of mechanical housing 19, and secondary passageway 20 having a cross sectional area substantially smaller than the cross sectional area of passageway 18. Secondary passageway 20 in alternative embodiments having other cross-sectional areas provided that a thrust member 3 cannot be received into passageway 20. It is preferred that secondary passageway 20 be formed substantially parallel to a center line X of housing 19.

A sensor is normally positioned in fluid communication with the passageway 18. In the preferred embodiment the sensor comprises an elastomeric diaphragm 21 that is is normally positioned adjacent surface 22 of the mechanical housing 19. Further, diaphragm 21 provides a substantially fluid tight seal between a mechanical housing 19 and a second end plate 32. It is understood that other sensors are contemplated herein, including but not limited to pressure switches, pressure transducers, mechanical switch actuators, and alarms. In another embodiment of the present invention the sensor is located remotely from the passageway 18, however the sensor is maintained in fluid communication with the passageway 18.

In the preferred embodiment the elastomeric diaphragm 21 has a first surface 21a that is normally disposed adjacent surface 22, and a second surface that abuts thrust member 3. The diaphragm 21 being subjected to fluid pressure communicating through secondary passageway 20 from the relatively confined passage 18.

At the other end of conical portion 18b of passageway 18 is located an overpressure protection member 24 for normally blocking the release of fluid into the environment from passageway 18, and being rupturable to protect the passageway 18 from overpressurization. In the preferred embodiment the overpressure protection member 24 is a frangible member, however other overpressure protection members are contemplated herein such as a direct spring loaded valve disc. One preferred material utilized for forming the frangible member 24 is a metal foil, however other materials such as plastics are contemplated herein. In the preferred embodiment the frangible member 24 is a disc having a thickness of about 0.001–0.002 inches. When the frangible member 24 ruptures, because the pressure within passageway 18 exceeds a predetermined threshold value, the fluid is vented from the relatively confined passageway 18. In the preferred embodiment frangible member 24 is designed to rupture at about fifteen (15) pound per square inch gage, however other frangible members having different rupture characteristics are contemplated herein.

The selection of a frangible member 24 having a relatively low bursting limit as compared to the threshold pressure relief value for opening pressure relief valve 15 normally prevents any excessive pressure build up in the relatively confined passageway 18. An excessive pressure build up within passageway 18 can adversely affect the operation of pressure relief valve 15. Frangible member 24 providing overpressure protection for passageway 18 while allowing a quantity of fluid to be trapped within the relatively confined passageway 18 in order to actuate the sensor.

In the preferred embodiment a compression spring 25 is positioned within the second end 19b of housing 19 to hold the frangible member 24 in place. Frangible member 24 being normally seated against a sealing seat 26 formed in housing 19. The spring 25 being held in place by a removeable end plate 27 that is connected to the mechanical housing 19 by a plurality of fasteners 28. In the preferred embodiment fasteners 28 are machine screws that are received within a threaded aperture 29 in the mechanical housing 19.

An outer housing end plate 30 is positioned between the end plate 27 and the spring 25 to allow the fluid released from passageway 18 to be directed to the fluid discharge outlet 31. In the preferred embodiment the outer housing end plate 30 defines a frangible member inspection window. The frangible member inspection window 30 allows a service technician to optically determine whether frangible member 24 is still intact without having to disassemble the components. More specifically, the service technician need only look through the window 30 to verify whether the frangible member 24 has been ruptured. The rupture of the frangible member 24 being an indicator that fluid has been released from the pressure relief valve 15. In the preferred embodiment the frangible member inspection window 30 is formed of a see through material A fluid discharge outlet 31 allows the release of fluid from the relief guard apparatus 16 upon frangible member 24 rupturing and mechanical reseating valve 15 being in an open position. With the frangible member 24 and pressure relief valve 15 in an open venting state fluid is allowed to vent from the condenser/pressure vessel 12.

A second end plate 32 is removeably coupled to the first end 19a of the mechanical housing 19 by a plurality of fasteners 33. In the preferred embodiment the fasteners 33 are threaded fasteners that engage a correspondingly threaded aperture 34 in the mechanical housing 19. A substantially cylindrical piston 35 is slidably positioned within a bore 5 of the second end plate 32. One end 150 of the piston 35 being normally positioned adjacent the diaphragm 21, which is normally positioned adjacent surface 22 of the mechanical housing 19. In the preferred embodiment a thrust member 3 is coupled to end 150 of piston 35. Thrust member 3 being a substantially flat, rigid member that contacts the diaphragm 21 in order to assist in transmitting forces acting on the diaphragm to the piston 35. The preferred thrust member 3 is a flat washer that is fixedly connected to the end 150 of piston 35.

Formed on piston 35 is a latch pin receiving channel 40. In the preferred embodiment the latch pin receiving channel 40 is a circumferential recess located proximate the first end 35a of the piston. A spring biased latch pin 42 is coupled to the second end plate 32 by an externally threaded portion 42a. The spring bias latch pin 42 normally engaging the outer circumferential surface 35c of the piston 35.

Figure 5:
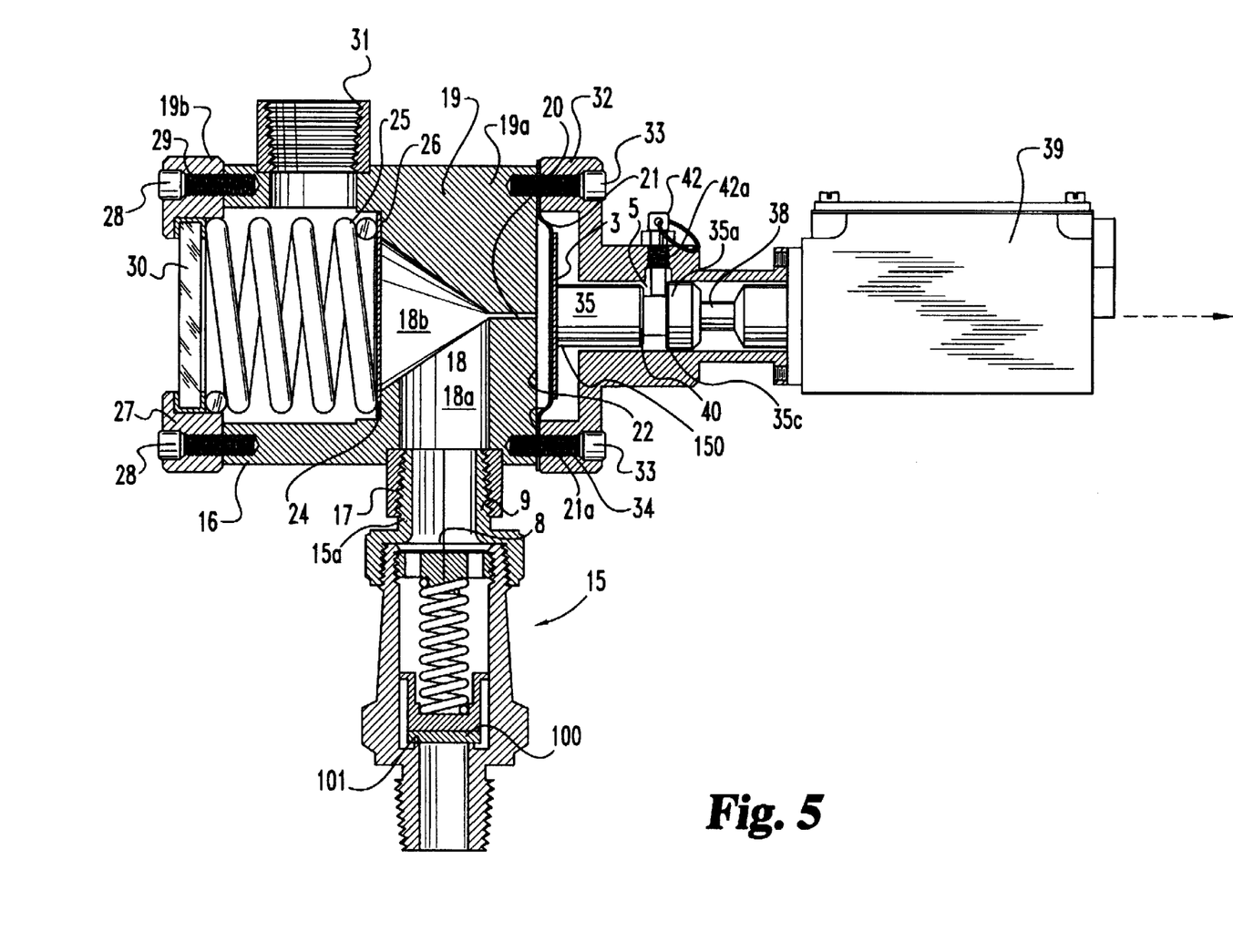
FIG. 5 is an enlarged sectional side elevational view of the pressure relief system of FIG. 3 in an actuated state.

In the preferred embodiment diaphragm 21 is subjected to the pressure within passageway 18 and upon having a sufficient force exerted by the pressurized fluid acting on the surface area of thrust member 3 the piston 35 is axially displaced. The axial movement of piston 35 within bore 5 is utilized to actuate a mechanical spring biased plunger 38 of a compressor stop switch 39. Upon actuation of plunger 38 the compressor stop switch 39 shuts off the compressor. The relief guard apparatus 16 being designed and constructed to normally stop the compressor before sufficient pressure can accumulate in passageway 18 to rupture the frangible member 24. After the piston 35 has been axially displaced a sufficient distance the latch pin 42 engages the latch pin receiving channel 40 (FIG. 5). With the latch pin 42 positioned within the latch pin receiving channel 40 the compressor stop switch 39 is locked in an off position. In order to reset the compressor it is necessary for a service person to manually reset the relief guard apparatus 16 by unlatching the spring bias latch pin 42 from the latch pin receiving channel 40.

Having described the structure of one embodiment of the pressure relief guard apparatus 16 structure an example of it's operation will now be set forth with the assistance of FIGS. 2–5. Mechanical pressure relief valves are generally known to have a mode wherein they weep fluid as they are subjected to pressures approaching their overpressure protection threshold. More particularly, the weeping of fluid from the valve is referred to by those of ordinary skill in the art as weeping or seeping, and is associated with a phenomenon referred to as a simmering pressure relief valve. In the present context simmering refers to the state of a pressure relief valve just prior to the valve reaching it's overpressure protection threshold. In the simmering state the pressure relief valve allows the seepage of fluid from the vessel. Reseatable pressure relief valves have a second mode wherein the valve opens at the overpressure protection threshold value to vent fluid therefrom in order to reduce the pressure in the pressure vessel. Further, mechanical reseatable pressure relief valves can also deteriorate and/or have defects that allow the leakage of fluid therefrom. Even a small unchecked leak can result in a substantial loss of fluid from the refrigeration system over time.

As the fluid pressure within the condenser/pressure vessel 12 increases the fluid exerts an increasing force on the moveable valve disc 100 within the mechanical reseating valve 15. When the pressure acting upon the valve disc 100 reaches a threshold value, one that is approaching the overpressure threshold protection value of the pressure relief valve, the valve begins to simmer. For example, the pressure relief valve 15 having an overpressure threshold opening valve of about four hundred pounds per square inch gage will have a simmering threshold valve of about three hundred and sixty-five pounds gage. It is understood that the simmering threshold valves will be dependent on the particular valve type, and the specification detailing these release values is generally provided by the valve manufacturer. The simmering of valve 15 causes the disc 100 to be intermittently displaced from seat 101 thereby allowing fluid to weep into passageway 18.

The weeping of fluid into the relatively confined passageway 18 causes a pressure change therein. A sensor senses the pressure change within the relatively confined volume of passageway 18. As the valve continues to simmer more fluid is released into and accumulates within the passageway 18, and if the simmering continues the pressure within the relatively confined passageway 18 can become sufficient to displace the diaphragm. Further, a leaking pressure relief valve allows the discharge of fluid into the relatively confined passageway 18. As the valve continues to leak more fluid is released into and accumulates within the passageway 18, and if the fluid leakage continues the pressure within the relatively confined passageway can become sufficient to displace the diaphragm. It is understood that a leaking pressure relief valve allows the passage of fluid therefrom at pressures below the overpressure protection threshold of the relief valve 15.

The axial displacement of diaphragm 21 acts upon thrust member 3 to force the piston 35 to slide axially within bore 5. Upon being displaced a sufficient axial distance, the piston 35 actuates the mechanical plunger 38 of the compressor stop switch 39 and shuts off the compressor thereby preventing further pressure increase by the compressor. The latch pin 42 then drops into the latch pin receiving channel 40 to prevent the restarting of the compressor without a service person manually resetting the latch assembly. Further, the service technician prior to resetting the relief guard apparatus must release the pressure from the relatively confined passageway 18. In one embodiment of the present invention the release of pressurized fluid is accomplished by loosening the connection at threaded joint 9.

In the event that the pressure continues to increase within the passageway 18 and reaches a predetermined threshold value the frangible member ruptures, thereby allowing the venting of the fluid into the environment. In the preferred embodiment the frangible member being designed and constructed to rupture at a pressure valve substantially less than the pressure valve necessary to open the pressure relief valve. Upon the bursting of the frangible member the relatively confined passageway 18 becomes open to the environment. Further, in the event of a sudden overpressure state the mechanical reseating valve 15 opens into passageway 18 and causes the frangible member to burst, thereby allowing the escape of fluid.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What we claim:

1. An apparatus, comprising:
   a refrigeration system;
   a pressure relief valve coupled to said refrigeration system for controlling the release of fluid therefrom;
   a normally relatively confined passageway in fluid communication with said valve for receiving fluid released from said refrigeration system;
   a member for normally preventing the release of fluid from said passageway and allowing the release of fluid from said passageway at a predetermined pressure, said predetermined pressure being substantially less than the pressure required for opening said valve.

2. In combination:
   a refrigeration system;
   a pressure vessel associated with said refrigeration system;
   a pressure relief valve coupled to said vessel, said pressure relief valve having a first mode wherein said valve opens at an overpressure state to vent fluid from said vessel for reducing the pressure therein, and said pressure relief valve having a second mode wherein fluid weeps therefrom upon the pressure within said vessel approaching said overpressure state;
   a normally relatively confined passageway in fluid communication with said valve for receiving the fluid weeping from said valve; and
   a sensor responsive to the pressure in said passageway.

3. A method for detecting the release of refrigerant from a pressure relief valve coupled to a pressure vessel within a mechanical refrigeration system, comprising:
   providing a relatively confined volume in fluid communication with the pressure relief valve;
   releasing into the relatively confined volume refrigerant from the pressure relief valve, said releasing at a pressure less than the pressure necessary for opening the pressure relief valve;
   accumulating the refrigerant from said releasing in the relatively confined volume; and
   sensing the pressure change in the relatively confined volume.

4. In combination:
   a refrigeration system;
   a pressure vessel within said refrigeration system;
   a pressure relief valve coupled to said vessel, said valve having a first mode wherein said valve substantially opens at a predetermined pressure to vent fluid from said vessel for reducing the pressure therein, and said valve having a second mode wherein fluid is released from said valve prior to said valve opening at said predetermined pressure;
   a normally relatively confined passageway in fluid communication with said valve for receiving the fluid released from said valve; and
   a sensor responsive to the pressure in said passageway.

5. An apparatus, comprising:
   a refrigeration system;
   a pressure relief valve coupled to said refrigeration system for controlling the release of fluid therefrom;
   a normally relatively confined passageway in fluid communication with said valve for receiving fluid released from said refrigeration system; and
   a substantially see through member associated with said passageway for allowing the optical determination as to whether said passageway has released fluid therefrom.

6. The apparatus of claim 1, further comprising a sensor responsive to the pressure in said passageway.

7. The apparatus of claim 6, further comprising a compressor, and wherein said sensor for interrupting the operation of said compressor in response to the pressure state in said passageway.

8. The apparatus of claim 7, wherein said pressure relief valve is a reseatable bubble tight pressure relief valve that normally opens to vent fluid therefrom at a first pressure value, and wherein said sensor interrupting the operation of said compressor at a pressure value less than said first pressure value.

9. The apparatus of claim 8, wherein said pressure relief valve being designed to normally open in a range of about two hundred to four hundred and fifty pounds per square inch gage.

10. The apparatus of claim 6, which further includes a mechanical housing coupled to said pressure relief valve, and wherein said passageway is formed in said mechanical housing and has a substantially conical portion.

11. The apparatus of claim 10, wherein said passageway has a volume in the range of about one to one and one half cubic inches.

12. The apparatus of claim 7, wherein said sensor comprises an elastomeric diaphragm that is in fluid communication with said passageway.

13. The apparatus of claim 12, which further includes a mechanical housing coupled to said pressure relief valve, and wherein said passageway is formed in said mechanical housing, and further including an actuation member slidable relative to said mechanical housing, said actuation member being moveable in response to the movement of said elastomeric diaphragm.

14. The apparatus of claim 13, wherein said actuation member is a cylindrical piston.

15. The apparatus of claim 13, which further includes a thrust member in contact with said elastomeric diaphragm for transmitting the force acting on said elastomeric diaphragm to said actuation member.

16. The apparatus of claim 13, which further includes a stop switch for controlling the operation of said compressor, and a safety latch for locking the compressor stop switch in an off position.

17. The apparatus of claim 16, wherein said safety latch includes a moveable latch pin having a first unlatched position and a second latched position, said actuation member further includes a recess for receiving said latch pin therein when said latch pin is in said second latched position.

18. The apparatus of claim 17, wherein said recess is defined by a channel configured to receive the latch pin, and said latch pin is spring biased, and further wherein said pressure relief valve is coupled to a condenser.

19. The combination of claim 2, further comprising a compressor, and wherein said sensor stops the operation of said compressor in response to the pressure in said passageway.

20. The combination of claim 19, wherein said sensor stops the operation of said compressor at a pressure less than the pressure required for opening said valve in said first mode, and wherein said valve is a reseatable pressure relief valve.

21. The combination of claim 2, further comprising a substantially see through member permitting visual determination as to whether said passageway has released fluid therefrom.

22. The combination of claim 2, further comprising a passageway overpressure protection member for normally blocking the release of fluid into the environment and for preventing the overpressurization of said passageway.

23. The combination of claim 22, wherein said overpressure protection member has a release limit for allowing the release of fluid from said passageway, and said release limit is less than the pressure required for opening said pressure relief valve.

24. The combination of claim 23, wherein said overpressure protection member ruptures to allow the release of fluid.

25. The combination of claim 19, which further includes a mechanical housing coupled to said pressure relief valve, and wherein said passageway is formed in said mechanical housing.

26. The apparatus of claim 25, wherein said passageway has a volume in the range of about one to one and one half cubic inches.

27. The apparatus of claim 20, wherein said sensor comprises an elastomeric diaphragm that is in fluid communication with said passageway.

28. The apparatus of claim 25, wherein said sensor comprises an elastomeric diaphragm that is in fluid communication with said passageway, and which further includes an actuation member moveable relative to said mechanical housing, said actuation member being moveable in response to the movement of said elastomeric diaphragm.

29. The apparatus of claim 28, which further includes a stop switch for controlling the operation of said compressor, and a safety latch for locking the compressor stop switch in an off position.

30. The apparatus of claim 29, wherein said safety latch includes a latch pin moveable between an unlatched position and a latched position, said actuation member further includes a recess for receiving said latch pin therein.

31. The method of claim 3, further comprising stopping the operation of a compressor in the refrigeration system in response to the pressure change within the relatively confined volume.

32. The method of claim 3, further comprising providing an overprotection member to normally block the release of fluid into the environment and protect the relatively confined volume from over pressurization, and further comprising allowing the overprotection member to release fluid so as to prevent the overpressurization in the relatively confined volume.

33. The method of claim 32, wherein said allowing comprises rupturing the overpressure protection member by the pressure in the relatively confined volume.

34. The method of claim 33, further comprising signaling the rupture of the overpressure protection member.

35. The method of claim 34, wherein said signaling includes providing a visual indication that the overpressure protection member has been ruptured.

36. The combination of claim 4, further comprising a compressor, and wherein said sensor stops the operation of said compressor in response to the pressure in said passageway.

37. The combination of claim 36, wherein said sensor stops the operation of said compressor at a pressure less than the pressure required for opening said valve.

38. The combination of claim 37 further comprising a mechanical housing, said relatively confined passageway disposed within said mechanical housing.

39. The combination of claim 38, wherein said relatively confined passageway having a volume of about one to one and one half cubic inches.

40. The combination of claim 4, further comprising an overpressure protection member for protecting the normally relatively confined passageway from overpressurization, and wherein said pressure vessel comprises a condenser.

41. The combination of claim 40, wherein said overpressure protection member has a burst limit, and said burst limit is less than the pressure required for opening said valve in said first mode.

42. The combination of claim 38, which further includes a piston slidable relative to said mechanical housing in response to the pressure within said passageway.

43. The combination of claim 42, wherein said sensor includes an elastomeric diaphragm for acting on said piston.

44. The combination of claim 43, which further includes a stop switch having an off position for stopping said compressor, and a safety for locking said stop switch in said off position.

45. The combination of claim 44, wherein said safety includes a latch pin contactable with an outer surface of said piston, said piston having a recess therein for receiving a portion of said latch pin.

46. The apparatus of claim 5, further comprising a sensor responsive to the pressure in said passageway.

47. The apparatus of claim 46, further comprising a compressor, and wherein said sensor stops the operation of said compressor in response to the pressure in said passageway.

48. The apparatus of claim 47, further comprising an overpressure protection member for normally blocking the release of fluid into the environment and for preventing the overpressurization of said passageway.

49. The apparatus of claim 48, wherein said overpressure protection member is formed of foil having a burst limit substantially below the pressure required for normally opening said valve.

50. The apparatus of claim 5, which further comprises a mechanical housing coupled to said pressure relief valve, and wherein said passageway is formed in said mechanical housing.

51. The apparatus of claim 50, further comprising an overpressure protection member for normally blocking the release of fluid into the environment and for preventing the overpressurization of said passageway.

* * * * *